June 2, 1959 W. BREAU 2,888,830
SPEED CHANGER FOR PULLEY DRIVES
Filed Dec. 8, 1955
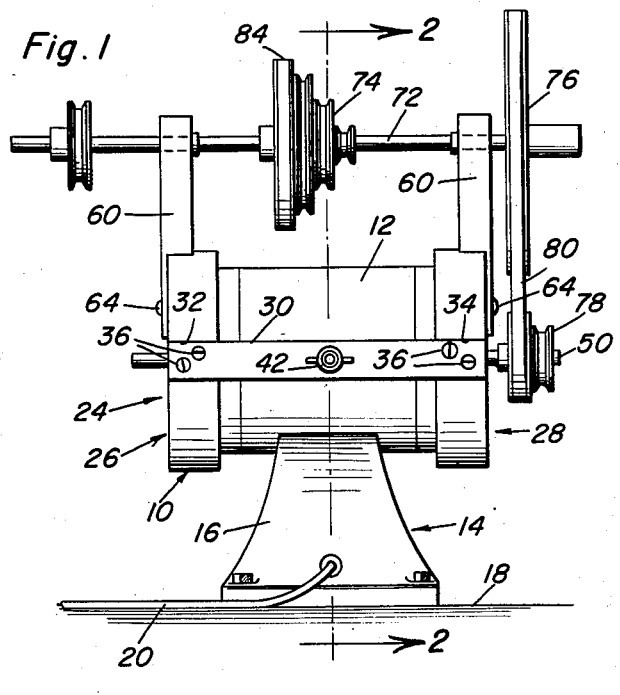
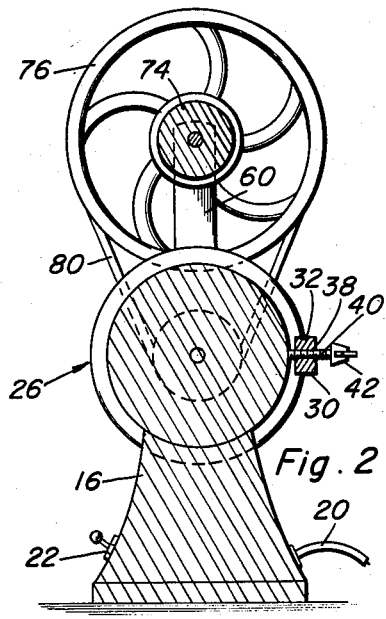
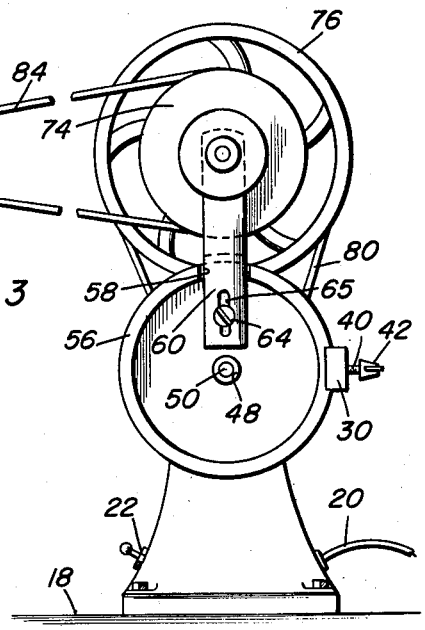
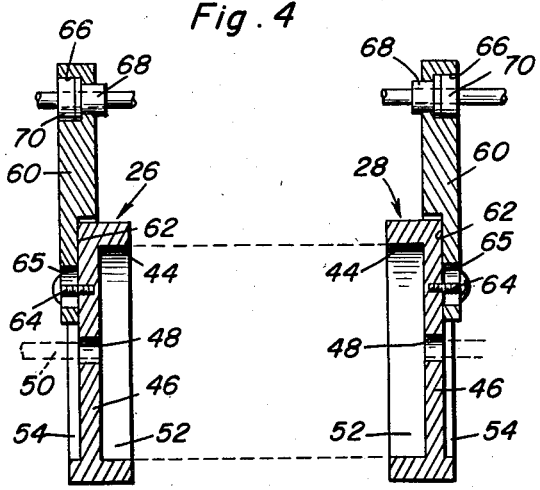
Wilfred Breau
INVENTOR.
BY *Clarence A. O'Brien*
*and Harvey B. Jackson*
Attorneys

United States Patent Office 2,888,830
Patented June 2, 1959

2,888,830
SPEED CHANGER FOR PULLEY DRIVES

Wilfred Breau, Miami Beach, Fla.

Application December 8, 1955, Serial No. 551,761

3 Claims. (Cl. 74—242.15)

This invention relates in general to belt drive mechanisms and more particularly to a new and improved speed changing device for pulley drives as used in conjunction with a power source and machinery driven by the power source.

Heretofore when using a belt drive device for machinery it has been necessary, when a change of speed of the machine spindle was desired, to stretch the belt over the pulleys. The constant stretching of the belt caused undue wear on the belt and a great deal of delay was encountered in machine operation caused by constant replacement or readjustment of the stretched belt. Therefore, the primary object of this invention is to provide a speed changing device for pulley drives which is adapted to be attached to an electric motor housing and may be rotated thereon to release the tension on a driven belt in order to quickly change the belt from one pulley to another without stretching the same.

Another object of this invention is to provide a speed changing device for pulley drives which has incorporated thereon a counter shaft which may be adjusted at varying distances from the drive shaft of the electric motor for adjusting the tension of a belt between the drive shaft and the counter shaft.

A further object of this invention is to provide a speed changing device for pulley drives which is of unitary construction, adapted to be attached to an electric motor housing and which may be selectively locked in a belt tensioning position to prevent undue vibration of the machine being driven.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevation showing the speed changing device attached to an electric motor which is mounted on a work surface and with a drive belt shown interconnecting the motor drive pulley and the counter shaft driven pulley;

Figure 2 is a sectional view taken substantially along section line 2—2 of Figure 1 and showing in detail the lock screw of the speed changing device;

Figure 3 is a side elevation showing the speed changing device attached to an electric motor and a driven belt interconnecting a drive pulley on the counter shaft and a pulley which represents a driven pulley on the machine being driven; and Figure 4 is a front fragmentary, sectional view taken substantially along the center lines of the counter shaft and the motor shaft with the motor housing indicated by dotted lines and portions of the counter shaft broken away.

Referring now to the drawings in detail it will be seen that the speed changer for pulley drives, referred to in general by the reference numeral 10, is attached to a cylindrical housing 12 of an electric motor, referred to in general by the reference numeral 14. There is provided a motor base 16 which is attached to the housing 12 and is carried by and attached to a support 18. The base 16 retains the housing 12 above the support 18 a sufficient distance to allow clearance for rotatably adjusting the speed changer 10 when adjustment is necessary. Leading to the base 16 there is provided a line cord 20 and there is also provided on the base 16 an on-off switch 22 for convenient operation of the motor 14.

The speed changer 10 consists of a frame, referred to in general by the reference numeral 24, which includes tubular end portions, referred to in general by the reference numerals 26 and 28 and an interconnecting bar 30. The bar 30 is rectangular in cross section and is longitudinally disposed in a groove 32 provided in the end portion 26 and a groove 34 provided in the end portion 28. The bar 30 is retained in the grooves 32 and 34 by means of screws 36 or the like, which insures unitary movement of the portions 24 and 26. Intermediate the portions 26 and 28 in the bar 30 there is provided a threaded aperture 38 which extends radially inward toward the housing 12 and which receives a threaded lock screw 40. The lock screw 40 is provided with a wing head 42 for manual adjustment and extends inwardly through the bar 30 and terminates at the housing 12.

As is best seen in Figure 4, the tubular end portion 26 has extending inwardly from an inner surface 44 thereof a web 46 which is formed integral with the portion 26 and has a centrally disposed aperture 48 provided therein. The aperture 48 is merely provided for clearance of a drive shaft 50 of the motor 14. The web 46 is so disposed in the end portion 26 as to form an inner circular recess 52 and an outer circular recess 54.

An outer rim 56 of the recess 54 has therein a suitable slot 58, to receive a radially extending stepped arm 60. An inner surface 62 of the arm 60 is held in close face-to-face relation to the outer face of the web 46 by means of threaded bolts 64 threadably engaged in the web 46. The inner ends of the arm 60 are provided with slots 65 for radial adjustment of the arm 60. The outer ends of the arm 60 are provided with stepped circular recesses 66 which receive a bushing 68 and bearing 70 therein. The tubular end portion 28 is identical in construction with the tubular end portion 26, and having an identical arm attached thereto, the end portions 26 and 28 being disposed in facing relation in the motor housing 12 and therefore identical reference numerals are utilized with reference thereto.

As is best seen in Figure 1 the bearings 70 carry a counter shaft 72 therein. The counter shaft 72 is disposed in parallel relation to the motor drive shaft 50. Intermediate the arms 60 on the counter shaft 72 there is disposed a multiple speed pulley 74, the pulley 74 may be retained on the shaft 72 by means of set screws, keys or other suitable means. On one end of the shaft 72, outside the arm 60, there is also placed a driven pulley 76. The pulley 76 may also be retained in any suitable manner. The motor drive shaft 50 has disposed on one end thereof a drive pulley 78 which may be of the multiple drive type or a single drive pulley. The pulley 78 is disposed in alignment with the pulley 76 so that a drive belt 80 may be placed in the groove of the pulleys 76 and 78 and a rotating force transmitted from the drive pulley 78 to the driven pulley 76.

As is best seen in Figure 3, the multiple pulley 74 is drivingly connected to a machine driven pulley 82 by means of a second belt 84.

In assembly and operation, the bearings 70 and bushings 68 are placed in the arms 60, the arms 60 attached to the tubular end portions 26 and 28 by means of the screws 64. The counter shaft 72 is placed in the bearings 70, with the multiple pulley 74 disposed between the arms 60 and the inner recesses 52 disposed in face-to-face relationship. The tubular portions 26 and 28 are assembled on a motor housing 12 and the bar 30 secured to the end portions, in the slots 34 by means of screws 36. The pulley 78 is secured to the motor shaft 50 and the pulley 76 is secured to the end of the counter shaft 72 in alignment with the pulley 78. The belt 80 is then placed on the pulleys 78 and 76 and the arms 60 radially adjusted to properly tension the belt 80 and place the counter shaft 72 in parallel relation to the shaft 50. It should be noted that the belt 84 should be placed around the multiple pulley 74 before assembling the frame 24. The belt 84 is now placed on the machine drive pulley 82, in alignment with the desired groove of the multiple pulley. The speed changer 10 is then rotated on the motor housing 12 to a proper belt tensioning position of the belt 84 after which the lock screw 40 is tightened, by means by the wing head 42, against the motor housing 12 to prevent further rotation of the speed changer 10 and retain it in the desired position.

It should be noted that once the belt 80 has been properly tensioned, unless a great range of speed change is needed, this need no longer be adjusted. When a change of speed of the driven pulley 82 is desired this may be quickly achieved by means of loosening screw 40, allowing the belt 84 to slacken, selecting the proper or desired pulley groove in pulley 74, rotating the speed changer back to a belt tightening position and then securing the lock screw 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a fixed power source and a driven pulley, a speed changer for pulley drives, said power source including a power shaft, said driven pulley being spaced from said power shaft; said speed changer including a frame, means for rotatably attaching said frame directly on said power source, shaft carrying means attached to said frame, a countershaft journaled in said shaft carrying means parallel to said power shaft, means for transmitting rotary motion from said power shaft to said countershaft, said rotary motion transmitting means including a first drive pulley carried by said power shaft, a driven pulley carried by said countershaft and a first endless belt interconnecting said first drive pulley and said counter-shaft driven pulley, a second drive pulley carried by said countershaft, and a second endless belt drivingly connecting said second drive pulley and said driven pulley, said frame being adjustably rotatable about said power source, the rotation of said frame being about the axis of said power shaft whereby the distance between the countershaft and driven pulley may be varied to tension or slacken said second endless belt without affecting either the distance between the power shaft and the driven pulley or the distance between the power shaft and the countershaft, said frame including tubular end portions and interconnecting means extending between said tubular end portions, said interconnecting means being rigidly attached to said tubular end portions for insuring unitary movement of the speed changer, lock means carried by said interconnecting means for selectively locking the speed changer against rotation on said power source.

2. In combination with a power source adapted to drive a belt driven device including a driven pulley, said power source being of the type including a housing having cylindrical end portions and a power shaft concentric with said end portions, a speed changer for pulley drives comprising a frame, said frame including means for rotatably attaching said frame directly on said end portions, shaft carrying means attached to said frame, a countershaft journaled in said shaft carrying means parallel to said power shaft, means for transmitting rotary motion from said drive shaft to said countershaft, said rotary transmitting means including a drive pulley carried by said power shaft, a driven pulley carried by said countershaft, and a first endless belt interconnecting said drive pulley and said countershaft driven pulley, a multi-speed pulley carried by said countershaft, said multi-speed pulley selectively receiving a second endless belt, said second endless belt drivingly connected to said driven pulley of said driven device, said frame being concentrically rotatable on said end portions for selectively positioning the speed changer on said power source whereby said second endless belt may be adjusted without affecting the adjustment of said first endless belt, said frame including tubular end portions and interconnecting means extending between said tubular end portions, said interconnecting means being rigidly attached to said tubular end portions for insuring unitary movement of the speed changer.

3. In combination with a power source adapted to drive a belt driven device including a driven pulley, said power source being of the type including a housing having cylindrical end portions and a power shaft concentric with said end portions, a speed changer for pulley drives comprising a frame, said frame including means for rotatably attaching said frame directly on said end portions, shaft carrying means attached to said frame, a countershaft journaled in said shaft carrying means parallel to said power shaft, means for transmitting rotary motion from said drive shaft to said countershaft, said rotary transmitting means including a drive pulley carried by said power shaft, a driven pulley carried by said countershaft, and a first endless belt interconnecting said drive pulley and said countershaft driven pulley, a multi-speed puley carried by said contershaft, said multi-speed pulley selectively receiving a second endless belt, said second endless belt drivingly connected to said driven pulley of said driven device, said frame being concentrically rotatable on said end portions for selectively positioning the speed changer on said power source whereby said second endless belt may be adjusted without affecting the adjustment of said first endless belt, said frame including tubular end portions and interconnecting means extending between said tubular end portions, said interconnecting means being rigidly attached to said tubular end portions for insuring unitary movement of the speed changer, lock means carried by said interconnecting means for selectively locking the speed changer against rotation on said power source.

References Cited in the file of this patent

UNITED STATES PATENTS

| | | |
|---|---|---|
| 2,517,328 | Lownsberg | Aug. 1, 1950 |
| 2,544,812 | Thompson | Mar. 13, 1951 |
| 2,778,235 | Amonsen | Jan. 22, 1957 |

FOREIGN PATENTS

| | | |
|---|---|---|
| 673,897 | France | Oct. 14, 1929 |